United States Patent [19]
Velander

[11] 3,865,229
[45] Feb. 11, 1975

[54] CONVEYOR BELT
[75] Inventor: Hugo W. Velander, Cary, Ill.
[73] Assignee: Borg-Warner Corp., Chicago, Ill.
[22] Filed: May 29, 1973
[21] Appl. No.: 364,382

[52] U.S. Cl. .............................. 198/193, 198/195
[51] Int. Cl. .............................................. B65g 15/36
[58] Field of Search ............ 198/189, 195, 184, 193

[56] References Cited
UNITED STATES PATENTS

| | | | |
|---|---|---|---|
| 2,065,931 | 12/1936 | Alling | 198/189 |
| 2,201,665 | 5/1940 | Hogander | 198/189 |
| 2,298,386 | 10/1942 | Jennings | 198/189 |
| 2,569,636 | 10/1951 | Imse | 198/189 |
| 2,694,484 | 11/1954 | Grebe | 198/189 |
| 3,262,550 | 7/1966 | Kampfer | 198/189 |
| 3,279,586 | 10/1966 | Kampfer | 198/189 |
| 3,324,991 | 6/1967 | Voss | 198/193 |
| 3,335,843 | 8/1967 | Duvivier et al. | 198/193 |
| 3,643,792 | 2/1972 | Resener | 198/189 |
| 3,669,247 | 6/1972 | Pulver | 198/189 |

*Primary Examiner*—James B. Marbert
*Assistant Examiner*—Richard K. Thomson
*Attorney, Agent, or Firm*—Aubrey L. Burgess

[57] ABSTRACT

An article-conveying sectioned flexible plastic belt having a plurality of interfitting notched tooth gear segments or link portions, and a center rib connecting the link portions in serial arrangement and carrying a steel cable inlay having swaged steel balls located at intersections of the link portions. The belt sections are secured together by a pin inserted through and uniting the two ends of two belt sections being further connected by a ball joint including a socket in the center rib of one belt section receiving a ball, secured to the cable and extending from the other belt section, snapped or inserted into the socket to lock the belt sections together. The conveyor belt is guided on, and held down to, a supporting member by spaced disc-shaped members fixed to the center rib and inserted into a generally T-shaped groove track of the supporting member.

7 Claims, 5 Drawing Figures

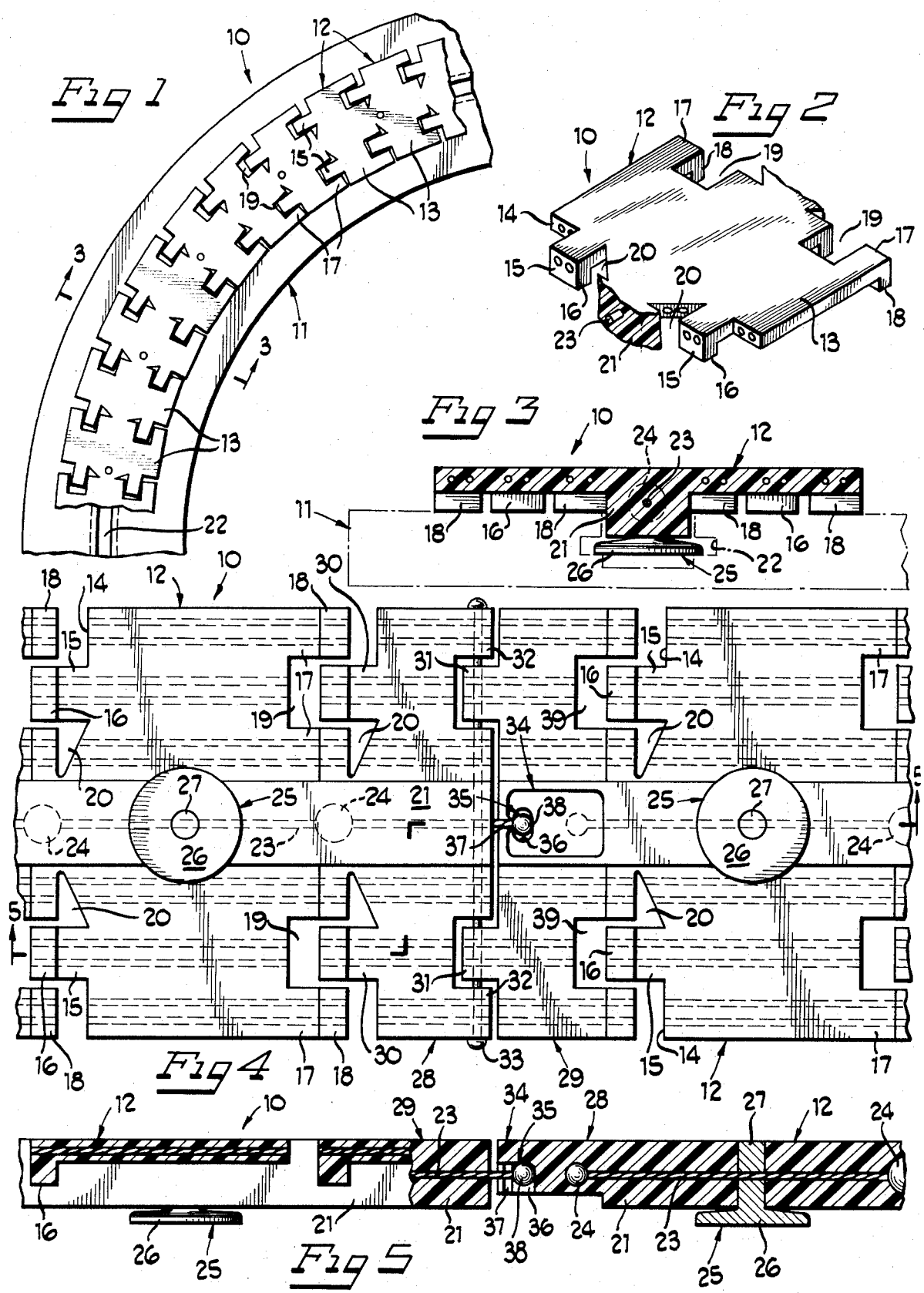

CONVEYOR BELT

BACKGROUND AND SUMMARY OF THE INVENTION

This invention relates to conveyor belts and more particularly to an improved flexible plastic gear-driven conveyor belt.

Conveyor belts which are formed with connected sections each having notched metal tooth gear links connected by hinge pins extending through aligned bores of interfitting portions of adjacent links, with provision for lateral flexing between the adjacent links for operation of the belt in a curved path, are known in the art. Generally, a substantial number of such link assemblies are required to be connected together to provide a conveyor belt of practical length, and transfer plates are necessary additions to pattern belts to provide for U-turns and angle turns without interrupting or breaking the continuous flow of the belt. Link conveyors of the foregoing type are useful, but have limited versatility because the links are frequently articulated by complex or permanent linkages which are usually constructionally expensive to manufacture and assemble and, therefore, involve higher production costs, and have limited adaptability to angular movements of an adjoining pair of links in an endless travel path.

The present invention provides an improved elastic sectioned conveyor belt with each section having a plurality of articulated plastic segments or links, a continuous plastic rib formed integral with and connecting the links and being centrally located and extending longitudinally of the belt section, and a metal cable inlaid in the rib to drivingly connect the links.

In its preferred and exemplary embodiment, the conveyor belt features a combination of important improvements including securing the cable to the rib by a plurality of metal balls swaged on the cable and embedded in the plastic rib and located at the intersections of the links; connecting the belt sections by a snap linking device in the form of a ball on the end of the cable of one belt section and positioned within a socket on the rib of the other belt section, and by a traversed pin inserted through interfitting portions of the end links of the belt sections adjacent the snap linking device; and providing spaced disc-shaped hold-down guides on the center rib inserted in a generally T-shaped groove track in a supporting member.

The objects of the invention are more fully identifiable hereinafter with reference to the description and also to the accompanying drawing.

BRIEF DESCRIPTION OF THE DRAWING

FIG. 1 is a top plan view of a portion of the improved conveyor belt traveling along a curved support.

FIG. 2 is an isometric view of a link of the conveyor belt shown in FIG. 1.

FIG. 3 is a vertical sectional view of the belt and its support taken on line 3—3 of FIG. 1.

FIG. 4 is a bottom plan view of a portion of the belt.

FIG. 5 is a vertical sectional view of the belt taken on line 5—5 of FIG. 4.

DESCRIPTION OF THE PREFERRED EMBODIMENT

The conveyor belt 10 is formed of a plastic material such as an elastic polymer such as rubber, or preferably, a polyurethane elastomer, that may be injection molded. As shown in the drawing, the belt 10 is positioned on a supporting member 11 for movement in straight and curved paths. The belt 10 comprises one or more sections each having a plurality of plastic segments in the form of notched tooth gear links 12, each link having an upper generally flat conveying surface 13, and being formed with each link having its forward edge 14 provided with lugs 15 having downwardly projecting gear teeth 16, the rear edge 17 having downwardly projecting gear teeth 18 and notches 19 receiving and accommodating the lugs 15 of an adjoining link, the lugs 15 and notches 19 being arranged on opposite sides of the transverse center of the link and the interfitting notches and lugs being spaced from each other to allow sufficient play to permit the links to be angularly related. Furthermore, as shown in FIGS. 2 and 3, the forward edge 14 of each link is provided with cut-out portions defining V-shaped notches 20 to additionally accommodate the angular relation of the links and provide flexibility to the belt.

The links 12 of the conveyor belt are connected by a plastic strip in the form of a web or rib 21 molded integral with the links and located on the transverse center of each link and extending the entire length of the belt section. The centrally-located rib 21 projects downwardly of the links and into a generally T-section groove track 22 in the supporting member 11. The rib carries a stainless steel cable 23 inlaid in the rib and extending the length of the rib. The cable 23 is provided with spaced stainless steel balls 24 located at the intersections of the center rib and gear tooth portions of the links and swaged onto the cable. Since the cable and its balls are embedded in the plastic rib, the cable 21 provides possibly 80 percent of the pulling strain during movement of the conveyor belt by sprockets (not shown) engageable with the gear teeth of the links.

Spaced belt guides 25 are carried on the center rib 21 and are provided by discs 26 positioned within the groove track 22 with each disc having a stem 27 inserted within an opening in the rib 21 and being connected to the rib 20 by cable 23 extending through the stem. Thus, guides 25 also function to hold down the conveyor belt to the supporting member during movement of the belt.

The belt sections are joined to each other to provide a continuous or endless belt by connecting plastic links 28 and 29 molded integral with the ends of the rib 21, the link 28 having spaced toothed lugs 30 on its forward edge received within notches 19 in the rear edge of the adjacent link 12, and the link 29 having spaced notches 30 receiving the lugs 15 on the front edge of adjacent link 12. The lugs 28 and 29 are provided with interfitting lug portions 31 and 32 adapted for mating engagement with each other to align respective openings therein for receiving a retaining means in the form of a retaining key or pin 33 to interconnect the belt sections. The belt sections are further secured together by cable linking means provided by a snap linking device 34 in the form of a ball joint comprising a socket 35 of keyhole shape in one end of the resilient rib 20 of a belt section and having an enlarged inner portion at 36 and a restricted slot at 37 forming a ball mounting for receiving a ball 38 on one end of the cable 22 extending from the other belt section. By pressing the ball 38 through the slot 37 and into the socket 35, the ball may be snapped or inserted into the ball socket 35. Owing to the elasticity of the plastic material of the rib, the ball mounting snaps back into its original position to lock the two belt sections together.

The conveyor belt of the present invention can be molded in approximately 40" lengths whereas a steel conveyor belt of the same length would require 20 or 30 different assembled sections, so that a considerable savings in production costs of the molded conveyor belt result. The improved conveyor belt can make U-Turns and angle turns during its movement without breaking its continuous flow, an advantage that pattern steel belts can only duplicate by the use of transfer plates. This type of belt can also angle from a horizontal plane up to and beyond a 90° vertical position. This allows two belts running parallel on horizontal plane to form a "V," and provides handling of round objects such as balls, cannisters, and the like.

Also from three belts, a square shaped "U" can be formed in similar manner to handle irregular objects which may have a tendency to fall off flat running belts. All this can be done at different stations with one series of belting starting from a horizontal position and with the same continuity. Also, the novel connections of the belt sections are comparatively simple for fast and easy repairs. The belt sections can be made of elastic polymerics, such as Viton, that are wear resistant and can be easily sterilized or cleaned making the conveyor belt very adaptable to pharmaceutical or other establishments requiring a high degree of sanitation.

While a preferred embodiment of the present invention has been illustrated and described, the invention is not to be limited to such disclosure since changes and modifications may be made therein and thereto within the scope of the following claims. For example, multiples of the conveyor belt can be used together and arranged to form a V or U shaped space therebetween to convey various regularly or irregularly shaped articles.

What is claimed is:

1. An article-conveying plastic belt comprising:
   a plurality of sections connected together;
   each section having a plurality of articulated links;
   a continuous central strip portion joining the links of each section in serial arrangement;
   each link section having a pair of segments separated by said central strip portion;
   each of said segments and said central strip portion having an article-supporting surface;
   each segment having front and back lugs at the edges thereof;
   the lugs of each segment interfitting with the lugs of the next adjacent segment; and
   means including a metal cable in said continuous central strip portion drivingly connecting said sections.

2. An article-conveying belt as defined in claim 1 in which a plurality of spaced balls are secured to said cable and embedded in said plastic strip.

3. An article-conveying belt as defined in claim 1 in combination with a belt-supporting structure having a groove track, said strips of said belt sections having guide portions extending into said groove track.

4. An article-conveying belt as defined in claim 1 in combination with a belt-supporting structure having a T-shaped groove track, said strips of said belt sections having guide portions extending into said groove track and disc portions engaging said track for holding said belt segments down to said support structure.

5. An article-conveying belt as defined in claim 1 in which means to connect said sections together comprises a socket in the strip of one belt section and a ball secured to the cable end extending from the other section and positioned within said socket.

6. An article-conveying belt as defined in claim 5 in which said ball snaps into said socket of said flexible plastic strip.

7. An article-conveying belt as defined in claim 5 in which said connecting means includes a transversed pin extending through the end lugs of said segments.

* * * * *